Aug. 28, 1956 J. B. BIDWELL 2,760,832
VISCOSITY COMPENSATING SYSTEM
Filed Nov 21, 1952
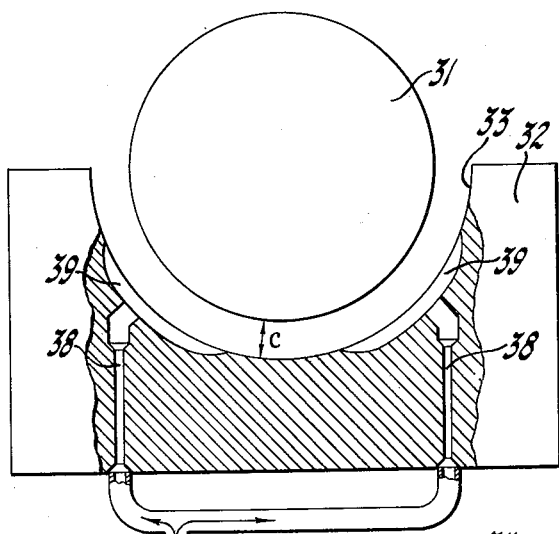
Fig.1
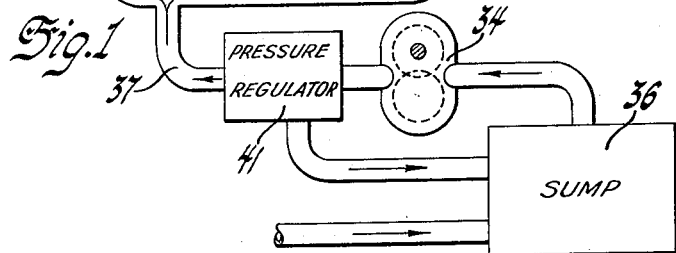
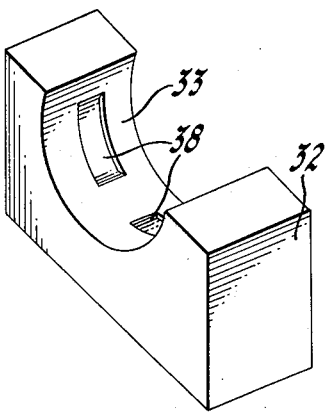
Fig.2
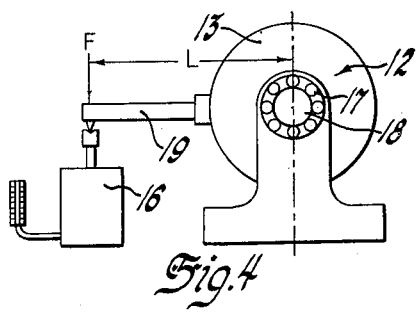
Fig.4
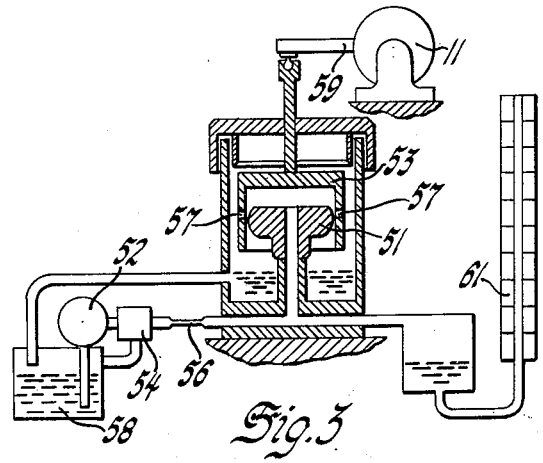
Fig.5
Inventor
Joseph B. Bidwell
By
Willits, Helwig & Baillio
Attorneys

United States Patent Office 2,760,832
Patented Aug. 28, 1956

2,760,832

VISCOSITY COMPENSATING SYSTEM

Joseph B. Bidwell, Royal Oak, Mich., assignor to General Motors Corporation, Detroit, Mich., a corporation of Delaware Application November 21, 1952, Serial No. 321,920

2 Claims. (Cl. 308—9)

The present invention relates to an apparatus for improving the temperature-viscosity stability of hydraulic circuits.

The present invention pertains to mechanisms utilizing hydraulic circuits whether for control, lubrication, measurement or support purposes which employ liquids, such as oil, whose viscosity, and hence flow characteristics, vary measurably with temperature changes. For the sake of simplicity, the present invention will be described and illustrated with oil as the hydraulic medium.

It is well known that if oil is used for any of the purposes suggested that as the viscosity of the oil changes, it becomes necessary to vary the quantity of oil available if substantially identical performance characteristics are continuously required of the oil. For instance, it is apparent that a more viscous fluid will flow more slowly and when partially confined, support a greater unit pressure than a less viscous fluid.

It is further apparent that where a standard of performance is set for a driven device which is dependent in some manner on the flow of oil and which standard must be substantially maintained, that subsequent changes in the temperature of the oil will vary the standard of performance unless a means is provided to compensate for such viscosity changes.

In particular, in an effort to obtain a higher order of accuracy in the measurement of engine output and motoring friction, applicant was confronted with the need for accurate and reliable power measurements in engine friction studies. It is essential in this and similar kinds of work to be able to measure accurately small changes in engine output since individual modifications to the engine may produce only small improvements or losses. However, if it is possible to determine accurately which modifications improve efficiency, then it may be possible to combine several changes which will have a sizable cumulative effect.

Although commercially available dynamometers and scale equipment are well suited for most engine testing, some refinement of the equipment is necessary to obtain the desired degree of accuracy for the special problem of engine friction.

Thus, it is generally an object of applicant's invention to provide a stabilized hydraulic circuit unaffected by viscosity changes.

In particular, it is an object to provide an hydraulic circuit in which the product of the quantity of fluid flow times the viscosity is substantially constant.

It is also an object to provide a viscosity compensating system which includes in combination a variably restricted flow passage, a pump, a passage connecting said pump with said restricted flow passage, and an hydraulic restrictor intermediate said flow passage and said pump whereby the quantity of fluid flow varies inversely with changes in fluid viscosity.

Other purposes and objects will be apparent from the specification and appended claims.

In the drawings:

Figure 1 is a journal supporting device shown in combination with applicant's viscosity compensating system.

Figure 2 is a detail of the supporting bearing of Figure 1.

Figure 3 shows applicant's viscosity compensating system combined with an hydraulic balance mechanism.

Figure 4 is a dynamometer testing mechanism.

To best illustrate and describe applicant's invention, it will be shown as adapted for use with torque measuring and testing equipment. The invention could, of course, be illustrated with innumerable hydraulic mechanisms and systems in which it is important to compensate for the temperature-viscosity effect of fluids and particularly of oil. With applicant's testing apparatus, he prefers to use an electric cradle dynamometer, of the type shown in Figures 1 and 2. An electric cradle dynamometer of the type used prior to that illustrated in Figures 1 and 2 is shown in Figure 4 and is frequently built with the field structure mounted on bearings to allow rotation. The cradled assembly is then restrained from turning by a torque measuring system indicated generally at 16. Rolling contact bearings 17 are usually used for supporting the cradle 18. The armature is mounted on separate bearings within the cradle. The engine or power apparatus is generally directly connected to the armature shaft and the engine torque transmitted to the cradle frame by electro-magnetic inter-action between the armature and the field. A weighing scale 16 is attached to the cradle frame 13 through a torque arm 19 measures the cradle torque reaction and from this torque reading, the engine or power apparatus output is determined.

One of the factors affecting the accuracy of the weighing system will be the condition of the bearing surface. Any surface irregularity on the bearing will add friction to the weighing system. Although the cradle bearing rotates only through a small angle, it is subjected to a considerable load. These conditions, coupled with vibration from the engine, result in two difficulties with ball and roller bearings:

(1) Fretting of the elements and the races, and
(2) Bearing friction causing errors in torque measurement.

Both of these problems are increasingly serious as torque measuring systems are made stiffer.

Fretting has long been a problem in dynamometer cradle bearings. It is caused by the small angular movement of the bearings under load always in the same area, and is evidenced by pitting and surface damage of the races in the contact area. These pits impair the satisfactory operation of the bearings, and it is necessary to provide some means for reducing the difficulties. Several schemes have been employed for this purpose. Contrarotating motor driven bearings and manually rotatable bearings have both been, and are being, used to avoid the problem of fretting.

Although rolling contact bearings are often called "anti-friction" bearings, they are not frictionless bearings. It is common to have a coefficiency of friction of about .001 for ball bearings of the type commonly used for cradling dynamometers. This results in static friction of about 0.3 pound beam load required for overcoming the cradle bearing friction in a representative 200 horsepower dynamometer. This value may be obtained with new bearings under the best conditions. Fretting results in greater errors. Errors of this magnitude are intolerable in certain cases as where experiments on engine friction are concerned, thus it was necessary to use a cradle bearing of a type which would provide greater accuracy.

The use of hydrostically supported bearings appeared to be the answer. Supporting heavy assemblies, such as a journal shaft 31 on a hydrostatic oil film within a bearing 32, as indicated in Figure 1, has been used extensively in the past to provide low friction contact.

The operation of a pressurized bearing depends upon the separation of the journal shaft 31 from a cylindrical bearing surface 33 by a film of oil under pressure. The film pressures are supplied by an external oil pump 34. The friction between surfaces of this type of bearing is then viscous friction which is proportional to the relative velocity between the surfaces. As this velocity is reduced to a very small value, the friction torque becomes vanishingly small. In the case of the engine dynamometer, the relative velocity is zero at the time torque measurements are made. In addition to exceptionally low friction torque, the oil film is not subject to fretting and long life of the trunnion bearing is attained.

The operation of a bearing, such as shown in Figure 1 is as follows: Oil is pumped from a sump 36 through a passage 37 through two viscous hydraulic resistances, or restrictors 38, to the pressurized bearing. The oil enters the bearing through two recesses or oblong oil pads 39 cut into the surface of the bearing. The major axes of the pads 39 are circumferentially aligned, the width of the pads being substantially less than the width of the bearing as shown in Figure 2. A pressure regulator 41, of any well known type, is interposed in passage 37 between the sump and the restrictors. After passing through the bearing, the oil returns to the sump. It is a function of the pressure regulator and the restrictor to stabilize the shape of the oil film. Unless some means were provided to compensate therefore, changes in viscosity as the result of temperature changes in the oil used in the bearing, the thickness or shape of the oil film would vary with a consequent distortion of torque reading.

The flow of many fluids, and particularly oil, generally vary inversely with viscosity within the range of viscous flow, that is to say as a liquid becomes thicker, less will flow, and conversely as it becomes less viscous or more fluid, more will flow. Rate of flow also varies with pressure. As shown in Figure 1, it is desired to keep the clearance C between shaft 31 and bearing surface 33 constant. The relationship between the flow rate through the bearing, pad pressure, clearance and oil viscosity is as follows:

$$Q = \frac{KPC^3}{m} \quad (1)$$

Where $Q$ = flow rate through bearing
$P$ = pad pressure
$C$ = clearance
$m$ = viscosity
$K$ = constant depending upon bearing geometry For a bearing of fixed geometry and fixed load, P is also a constant. Thus, in order that C remain constant, the product ($Qm$) must remain constant. This is achieved by placing a viscous restrictor in series with the bearing pad. The pressure regulator supplies a constant pressure $p$, to the pump side of the restrictor resulting in a fixed pressure drop across the restrictor. The relation between pressure drop, viscosity, and flow rate for a restrictor of fixed geometry is:

$$Q = \frac{k(p-P)}{m} \quad (2)$$

Where $k$ is a constant depending upon restrictor geometry

It should be noted that this Q is the same flow rate as that through the bearing since the bearing and restrictors are in series. Then, since the pressure drop ($p-P$) is constant, the restrictor causes the product of flow rate and viscosity ($Qm$) to remain constant. This is exactly the relation required to maintain a constant clearance in the externally pressurized bearing.

Though the principal force applied to the bearing is the weight of the cradle assembly, it must be able to sustain some loads in a horizontal plane. Referring again to Figure 1, it may be seen how the two pads 39 and restrictors 38 also supply this stability. If the journal is displaced toward the right in the clearance space, the flow rate would be reduced to the right-hand pad due to the more restricted flow passage and increased to the left pad.

The manner in which the pressure in the pads varies with displacement may be shown for small viscosity changes by eliminating Q between Equations 1 and 2. This is permissible since the flow rate through the restrictor and bearing are equal, since they are in series. The resulting expression may be reduced to:

$$P = \left[\frac{k}{KC^3 + k}\right] p \quad (3)$$

It is evident from this expression that as the journal approaches one pad, reducing the value of C, the pressure in that pad increases. In addition, the opposite effect occurs at the other pad resulting in a reduced pressure. The resultant effect of the aforementioned pressure changes is to return towards center, and thus stabilize the journal. Thus the viscous restrictors compensate for changes in viscosity of the oil to produce a hydro-static film of constant thickness as well as helping to maintain the journal shaft in a central position.

A modified form of applicant's device is shown in Figure 3 as applied to an hydraulic torque measuring mechanism. In this type of mechanism, changes in viscosity can effect an inaccurate reading. By incorporating applicant's device with such a mechanism, stabilized operation and torque readings are possible. In this type of mechanism, a variable beam load is balanced by an hydraulic pressure acting on hydraulic piston 51. This piston also acts as a valve to regulate the pressure to produce a balance. The load is then indicated as a pressure on a suitable sensitive element. Figure 3 represents a sketch of this type of unit. Oil supplied by a pump 52 passes through the center of the piston 51 into a movable cylinder 53. Cylinder 53 is open at one end to receive piston 51. A pressure regulator 54 and a restrictor 56 are interposed between the pump and cylinder to improve temperature stability. The oil circuit is completed through cylinder ports 57 and back to a sump 58. Dynamometer 11 includes a torque arm 59. Vertical movement of the cylinder 53 which is connected to the dynamometer torque arm regulates the oil flow through ports 57 and thus the pressure in cylinder 53. The dynamometer beam load tends to force the cylinder 53 downward, thus restricting flow through the ports. Oil pressure within the cavity defined by the closed end of the cylinder and piston 51 tends to move the cylinder upwards, thus opening the ports. The degree of restriction at the ports, and therefore the pressure required to allow constant flow, depends upon the position of the ports with respect to the rounded surfaces of the piston adjacent the ports. For equilibrium of forces, the load applied by the dynamometer must be balanced by the oil pressure acting on the cylinder. The cylinder will move until this equilibrium is attained. The pressure times the area of the piston is then proportional to the dynamometer beam load. The cylinder pressure can be determined on a manometer of a pressure gauge 61 which may be calibrated in pounds or footpounds.

An hydraulic balance of the aforementioned type suffers zero drift as the viscosity of the fluid changes with temperature. Thus in the same sense as described above, pressure regulator and restrictor cause the quantity of oil flow to vary so as to offset such viscosity changes. The restrictor is designed to have the same viscosity-flow rate characteristic as the valve, that is ports 57 and piston 51, in the weighing cell so that the position of the valve will depend only on load and will be independent of the fluid viscosity.

While particular embodiments of applicant's device have been disclosed and described, it is apparent that various structural modifications may be made within the scope of the invention.

I claim:

1. A journal bearing of the type comprising a journal, a journal supporting member having a cylindrical bearing surface, and means for supporting said journal upon an oil film in radially spaced relation with the bearing surface, in which said means includes a viscosity compensating system for maintaining the radial space between the journal and bearing surface constant despite variations in the oil viscosity, said system including in combination a plurality of spaced oblong oil pads recessed in the bearing surface, the major axes of said pads being circumferentially aligned, a plurality of conduits formed in the journal supporting member, each of said conduits respectively communicating at one end with the center of one of the pads, a common supply passage communicating with the other end of the conduits, said conduits including a restricted portion intermediate the ends thereof, a pump means for supplying fluid under pressure to the common supply passage, and a pressure regulator connected in series intermediate the pump and common supply passage for supplying a constant pressure to the supply passage.

2. A journal bearing of the type comprising a journal, a journal supporting member having a cylindrical bearing surface, and means for supporting said journal upon an oil film in radially spaced relation with the bearing surface, in which said means includes a viscosity compensating system for maintaining the radial space between the journal and bearing surface constant despite variations in the oil viscosity, said system including in combination a plurality of spaced oblong oil pads recessed in the bearing surface, the major axes of said pads being circumferentially aligned, the width of said pads being substantially less than the width of the bearing surface, a plurality of conduits formed in the journal supporting member, each of said conduits respectively communicating at one end with the center of one of the pads, a common supply passage communicating with the other end of the conduits, said conduits including a restricted portion extending substantially the length of the conduit, a pump means for supplying fluid under pressure to the common supply passage, and a pressure regulator connected in series intermediate the pump and common supply passage for supplying a constant pressure to the supply passage.

References Cited in the file of this patent

UNITED STATES PATENTS

| | | |
|---|---|---|
| 2,072,180 | Paton | Mar. 2, 1937 |
| 2,354,296 | Arms | July 25, 1944 |
| 2,489,136 | Hoffstrom | Nov. 22, 1949 |
| 2,526,450 | Aspin | Oct. 17, 1950 |
| 2,536,663 | Schaer | Jan. 2, 1951 |
| 2,578,711 | Martellotti | Dec. 18, 1951 |

FOREIGN PATENTS

| | | |
|---|---|---|
| 202,691 | Great Britain | Aug. 27, 1923 |